United States Patent [19]

Pieren

[11] Patent Number: 5,564,673
[45] Date of Patent: Oct. 15, 1996

[54] PILOT-OPERATED HYDRAULIC VALVE

[75] Inventor: Heinz Pieren, Gunten, Switzerland

[73] Assignee: Hydrotechnik Frutigen AG, Frutigen, Switzerland

[21] Appl. No.: 300,471

[22] Filed: Sep. 2, 1994

[30] Foreign Application Priority Data

Sep. 6, 1993 [DE] Germany .......................... 43 30 073.1

[51] Int. Cl.$^6$ .................................................. F16K 31/12
[52] U.S. Cl. ........................... 251/30.03; 251/37; 251/38; 251/44; 137/492.5
[58] Field of Search ....................... 137/492.5; 251/30.01, 251/30.02, 30.03, 38, 43, 44, 37

[56] References Cited

U.S. PATENT DOCUMENTS

| 1,402,016 | 1/1922 | Raymond | 137/492.5 |
|---|---|---|---|
| 1,510,161 | 9/1924 | Raymond | 137/492.5 |
| 2,213,147 | 8/1940 | Parkins et al. | 137/492.5 |
| 2,664,102 | 12/1953 | Coberly | 137/492.5 |
| 3,858,841 | 1/1975 | Haynes | 251/30.03 |
| 4,682,622 | 7/1987 | Weber | 137/492.5 |
| 4,699,351 | 10/1987 | Wells | 251/30.01 |

*Primary Examiner*—A. Michael Chambers
*Attorney, Agent, or Firm*—Tarolli, Sundheim, Covell, Tummino & Szabo

[57] ABSTRACT

A pilot-operated hydraulic pressure relief valve (HV) includes a main valve element (5) which is biased into a closed position by a spring (6). A pilot valve (VV1) has an open condition and a closed condition. A relief device (EV) is actuatable by the pilot valve (VV1) between an activated condition in which the force exerted by the spring (6) on the main valve element (5) is at a reduced level and a deactivated condition in which the force exerted by the spring on the main valve is at an increased level. The relief device (EV) includes a movable spring support (8) which supports a first end of the spring (6). A second end of the spring (6) is supported for movement with the main valve element (5). The movable spring support (8) is movable between a first position relatively far from the main valve element (5) when the relief device (EV) is in the activated condition, to decrease the biasing effect of the spring (6), and a second position relatively close to the main valve element when the relief device is in the deactivated condition, to decrease the biasing effect of the spring.

17 Claims, 4 Drawing Sheets

5,564,673

PILOT-OPERATED HYDRAULIC VALVE

TECHNICAL FIELD

The invention pertains to a pilot-operated hydraulic valve, in particular a hydraulic valve which is constructed as a pressure release and pressure control valve according to the characteristics of the preamble of claim 1.

BACKGROUND ART

Pressure relief valves, i.e., valves which make possible the switching of the pressure in a hydraulic system between an operating pressure and a lower circulation pressure, are known in numerous variations, in particular also in the form of combined pressure release and pressure control valves (see, for example, the pamphlet D-6.4 "Electrically actuated pressure control and pressure reducing cartridges NG10" by the company Hydrotechnik Frutigen AG, Apr. 30, 1998 [sic]). These known valves are provided with a main valve with a relatively strong resetting prestress that acts in the closing direction so as to prevent malfunctions, in particular at higher operating pressures as well as higher flow rates. However, this high closing or resetting prestress causes a correspondingly high circulation pressure in the unloaded condition of the valve, whereby the aforementioned circulation pressure of these known valves lies between approximately 4 and 8 bar.

SUMMARY OF THE INVENTION

The invention is based on the objective to create a valve of the initially mentioned type which is characterized by a low circulation pressure and a high operational dependability, namely also for higher operating pressures and higher flow rates.

According to the invention, this objective is attained by the characteristics disclosed in claim 1. This solution is based on the idea to alter the resetting prestress of the main valve automatically in dependence on the operating pressure mode or the circulation pressure mode and the corresponding positions of the pilot valve. In the valve according to the invention, the relief device for switching from the operating pressure to the circulation pressure is altered by means of the pilot valve from a deactivated position into an activated position with a reduced effect of the resetting element on the main valve and vice versa.

With respect to a particularly simple, robust and dependable construction of the pressure relief valve according to the invention, it is advantageous to construct the pilot valve in such a way that it may be changed between a first position which is assigned to the circulation pressure mode, preferably a fixed open position in which the relief device is activated, and a second position which is assigned to the operating pressure mode, preferably a fixed closed position in which the relief device is deactivated.

An embodiment which is constructed according to the following characteristics represents an advantageous development for a pressure relief and pressure control valve: the pilot valve according to this embodiment is constructed such that it may be changed between a first mode in which the relief device is activated and a second mode in which the relief device is deactivated. The first mode serves for reducing the valve intake pressure to a lower circulation pressure value, but the second mode serves for a continuous control so as to limit the valve intake pressure to an operating pressure value that may be preset. In addition, a prestressing element, which may be adjusted in accordance with the limiting response values of the valve intake pressure that may be preset, is provided for the pilot valve. In the second mode, the degree to which the pilot valve opens is determined by the valve intake pressure in relation to the limiting response value.

BRIEF DESCRIPTION OF THE DRAWINGS

The invention is described in detail below with the aid of the embodiments illustrated in the figures. The figures show.

DESCRIPTION OF PREFERRED EMBODIMENTS

Figure 1:
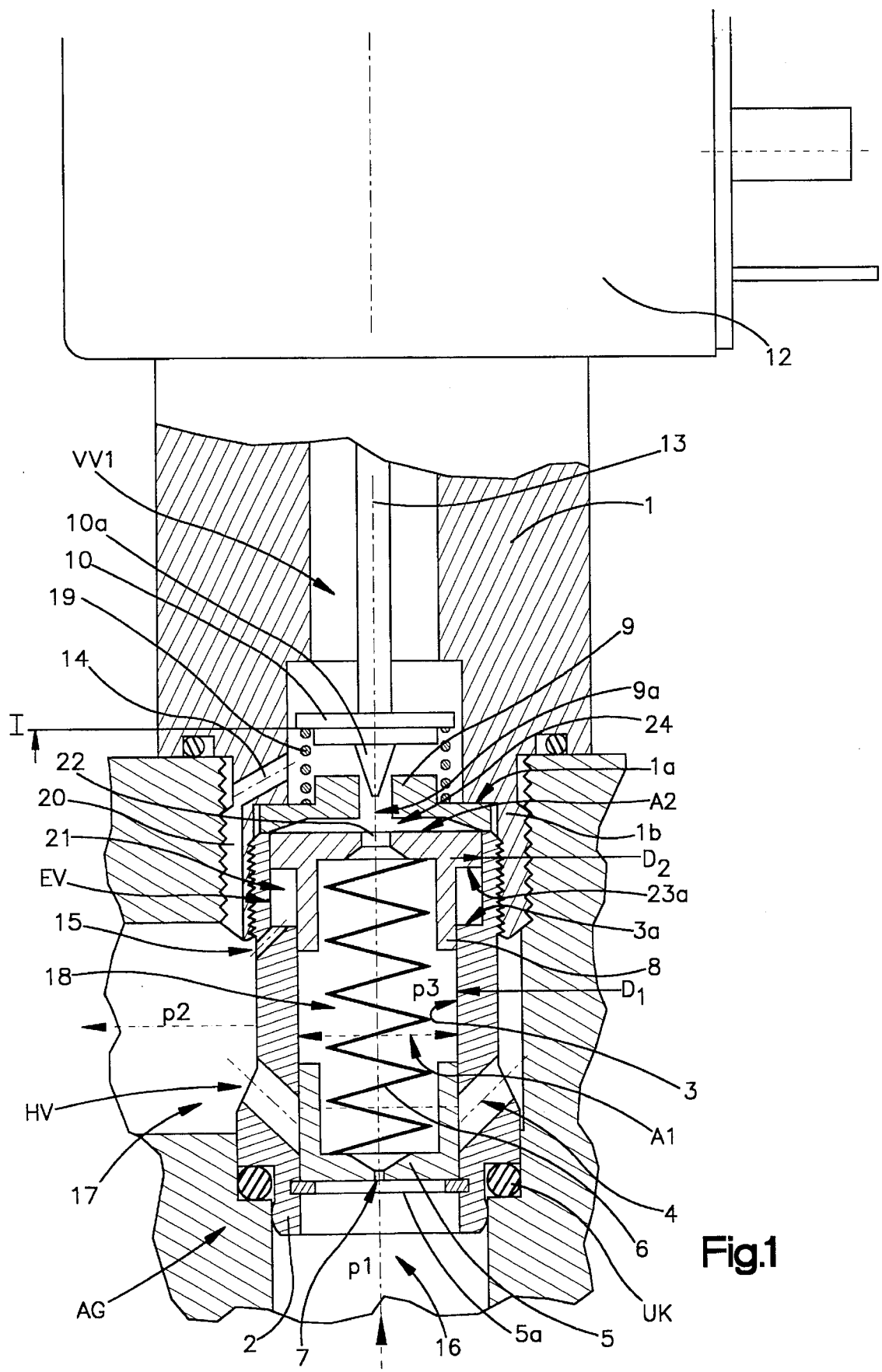
FIG. 1: an axial section through a pressure relief valve according to the invention in the form of a cartridge.

Next, an overview about the essential components of the pressure relief valve according to FIG. 1 and their functions:

The valve comprises a valve body 1 with a thread 1a into which is screwed a valve bushing 2 with a stepped bore and transverse bores 4. This results in a valve cartridge which is screwed into a corresponding bore of a connection housing AG which is not of particular interest in this context and only partially indicated in the figures with a threaded projection 1b. In the connection housing are situated an intake line 16 with an intake pressure p1 and an outlet line 17 with an outlet pressure p2. The main flow path from the intake line to the outlet line is indicated by arrows.

In the lower region of the valve bushing with the smaller stepped bore diameter D1 is situated a main valve HV with a slide-shaped main valve element 5 and a main valve resetting element 6 that is constructed as a helical pressure spring. The piston surface A1 of the main valve element 5 corresponds to the smaller stepped bore diameter D1 and is identified by the dotted-dashed lines in FIG. 1. The region of the stepped bore with the diameter D1 forms a control pressure chamber 18 with a control pressure p3 on the upper side of the main valve element 5. The control pressure chamber 18 is connected to the intake line 16 via a nozzle-like bypass throttle 7 in the main valve element 5. The respective value of the control pressure p3 consequently corresponds to the intake pressure p1 which was reduced by the pressure drop in the throttle 7. The relevant flow conditions in the valve will be described in detail below in association with the entire function of said valves.

The main valve element 5 is stressed in the direction toward a stop ring 5a by the resetting element 6 and is situated in the initial position indicated in FIG. 1 in which it closes the transverse bores 4 and interrupts the flow between the valve intake and the valve outlet when it adjoins said stop ring. The main valve element 5 is situated in this initial position as long as the axial force generated on the piston surface A1 by the pressure difference p1–p3 falls short of the effective force of the resetting element 6 in the respective mode. The flow is released once the main valve element 5 is shifted into the region of the inner openings of the transverse bores or above it its low edge UK (also indicated by dotted-dashed lines).

In the upper portion of the valve element 1 is situated a pilot valve which is identified as a hole by the reference symbol VV1 and triggered via a tappet 13 by an electromagnet 12 that is attached on the upper end of the valve body. The pilot valve VV1 comprises a pilot valve element 10 that is provided with a valve cone 10a and firmly connected to the tappet 13 of the electromagnet 12 as well as a valve seat body 9, with the valve bore 9a of which the valve cone 10a cooperates. If the electromagnet 12 is switched off, the valve element 10 assumes the raised position I illustrated in FIG. 1 due to the effect of a relief spring 19, i.e., a fixed open position with respect to the valve bore 9a in this example. When switching on the electromagnet 12 is turned, the valve element 10 is pressed against the valve seat body 9 via the tappet 13 and the valve bore 9a is closed. The fluid chamber above the pilot valve VV1 essentially is charged with the valve outlet pressure p2 via a discharge bore 14 and an adjacent longitudinal groove 20 in the threaded projection 1b of the valve body 1.

A relief device which is identified as a whole by the reference symbol EV is situated underneath the pilot valve VV1. This relief device comprises a control piston 8 which is constructed as a differential piston and arranged in the stepped bore 3 of the valve bushing 2 with two stepped sections with of diameters D1 and D2. The main valve resetting element 6 which is constructed as a helical pressure spring braces itself between the main valve element 5 and the control piston 8, i.e., it has the tendency to increase the distance between the main valve element and the control piston. When the control piston is displaced upward, said control piston reaches its final position by adjoining the lower side of the valve seat body 9, and if the control piston is displaced downward, said control piston reaches its final position by adjoining a shoulder 3a of the stepped bore 3.

Figure 1A:
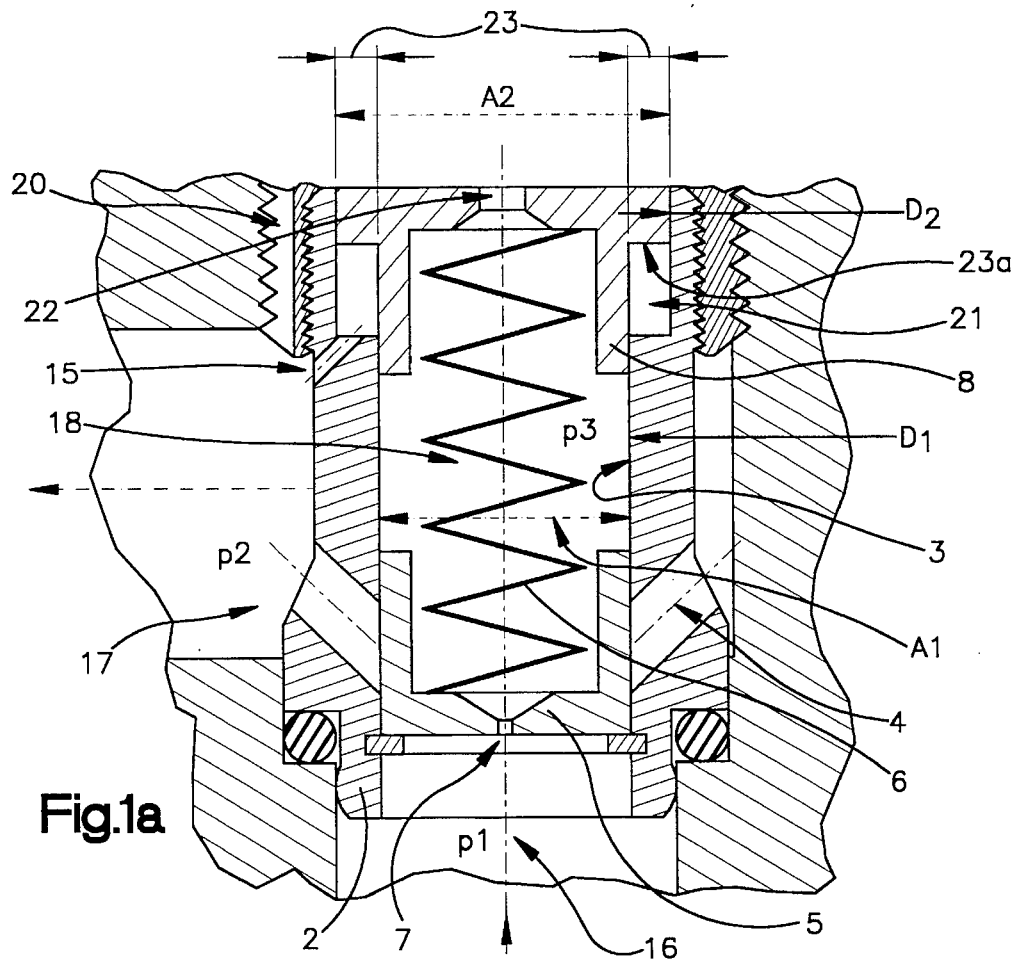
FIG. 1a: an enlarged detail inside of the valve according to FIG. 1, FIG. 2: an enlarged representation of a central part of the valve according to FIG. 1, but in the operating pressure mode.

The lower piston surface of the control piston 8 which corresponds to the piston surface A1 of the main valve element is situated in the control pressure chamber 18, while the upper piston surface A2 of the control piston which is drawn in dotted-dashed lines is situated within the section of the stepped bore that has the diameter D2 and consequently limits an intermediate space 24 in association with the valve seat body 9. A passage 22 that has a cross section which is substantially larger than the one of the throttle 7 connects the control pressure chamber 18 to the intermediate space 24. Consequently, the upper side and the lower side of the control piston 8 are always charged with the identical pressure, namely the control pressure p3. The resulting effective surface 23 of the control piston 8 corresponds to the difference A2–A1 and is indicated in FIG. 1a by its radial dimensions. The lower rear side 23a of the effective surface limits a relief chamber 21 which is connected to the valve outlet side 17 via a relief bore 15 and consequently is always charged with the generally negligible low valve outlet pressure p2. Consequently, the resultant of the fluid pressure forces acting upon the control piston is $Prs=p3\times(A2-A1)$. This resultant is opposed by the force Phv of the main valve resetting element 6. Consequently, the actual displacement direction of the control piston is determined by the algebraic sign of the resulting differential force $Pd=Phv-Prs$. With referenced to FIG. 1, a positive Pd represents a displacement toward the top, i.e., an activation of the relief device and a consequent reduction of the main valve prestress, while a negative Pd represents a displacement toward the bottom, i.e., a deactivation of the relief device and a consequent increase of the main valve prestress.

Figure 2:
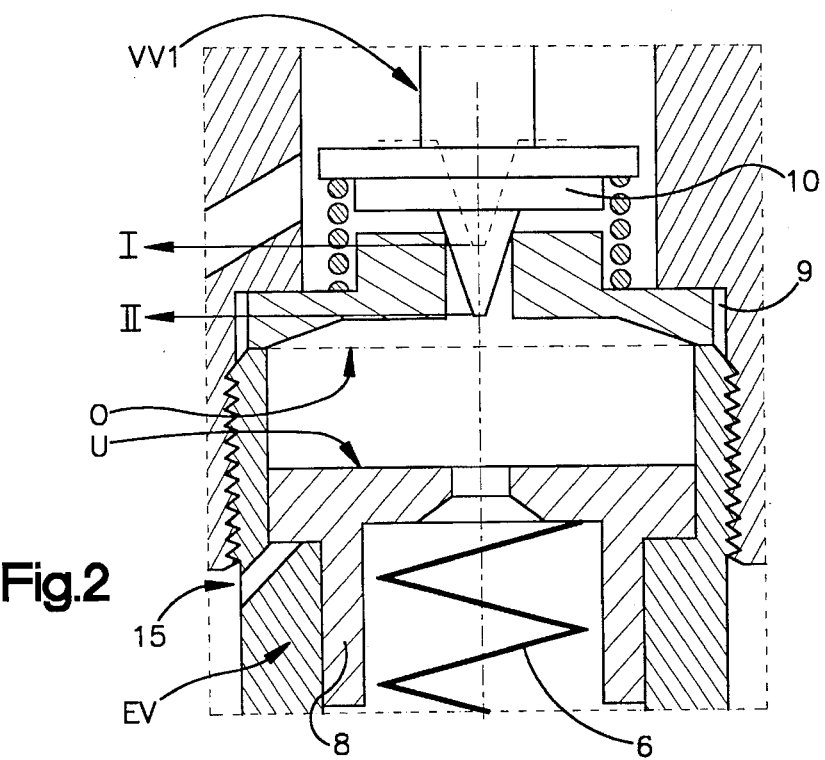

The entire function of the relief valve is explained below with reference to FIGS. 1, 1a and 2:

In FIG. 1, the valve is illustrated in its inoperative condition. During circulation, the main valve element 5 is more or less opened as indicated in FIG. 1 by the position of the lower edge UK of the main valve element which is drawn in dotted-dashed lines.

According to FIG. 1, the pilot valve VV1 assumes its fixed open position I in which the valve bore 9a is released entirely. In this way, the control pressure p3 is defined by the feed flow from the valve intake 16 into the control pressure chamber 18 via the bypass throttle 7 and the discharge flow from said control pressure chamber to the valve outlet 17 via the pilot valve. The cross sections of the valve bore 9a and the passage 22 in comparison to those of the bypass throttle 7 in the main valve element 5 are dimensioned in such a way that p3 approximately drops to p2 and the entire pressure drop p1–p2 practically occurs at the throttle 7 in this mode. In addition, the supporting force and the rigidity of the main valve resetting element 6 as well as the effective surface A2–A1 of the control piston 8 are dimensioned in such a way that it is insured that Phv is larger than $Prs=p3\times(A2-A1)$, i.e., $Pd=Phv-Prs$ becomes positive. Consequently, the control piston moves into its upper final position O and relieves the resetting element 6 to the desired low closing prestress of the main valve element 5 with a correspondingly low circulation pressure. When switching the electromagnet 12 into the operating pressure mode, the pilot valve VV1 assumes its fixed closed position II shown in FIG. 2, so that the discharge flow from the control pressure chamber 18 is interrupted, and the control pressure p3 is increased to the valve intake pressure p1 by means of pressure compensation via the bypass throttle 7. Consequently, $Prs=p3\times(A2-A1)$ assumes a value which in any case is substantially higher than the maximum value of the supporting force Phv of the main valve resetting element 6. Consequently, Pd in any case becomes negative, and the control piston 8 is moved from its upper final position O into its lower final position U (see FIG. 2) while increasing the closing prestress of the main valve element 5 to its maximum value. Consequently, it is insured that the main valve element 5 reaches its closing position due to the pressure compensation p3=p1 and the increased closing prestress of the resetting element 6.

Figure 3:
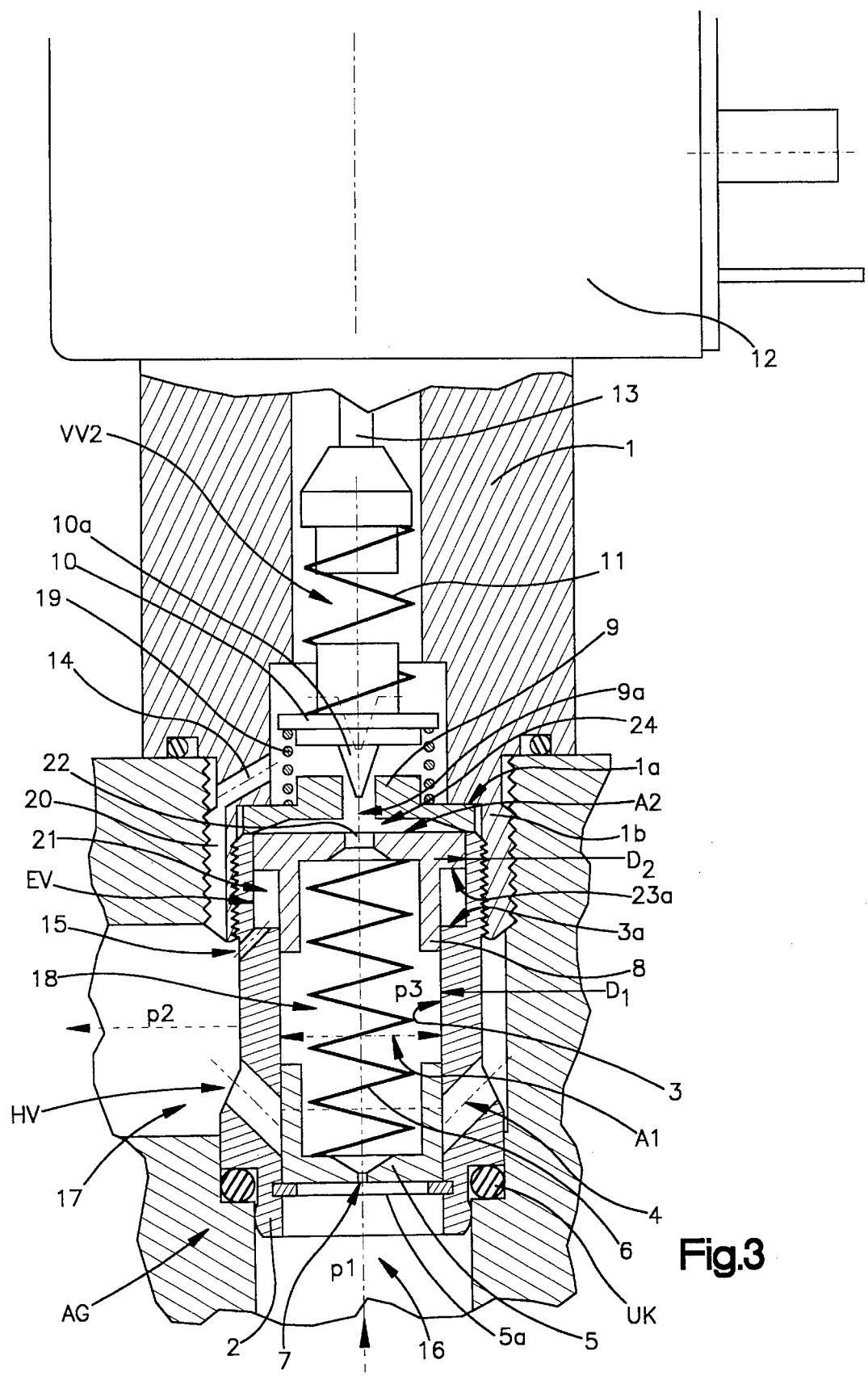
FIG. 3: an axial section through a pressure relief and pressure control valve according to the invention, namely also in the form of a cartridge.
Figure 4:
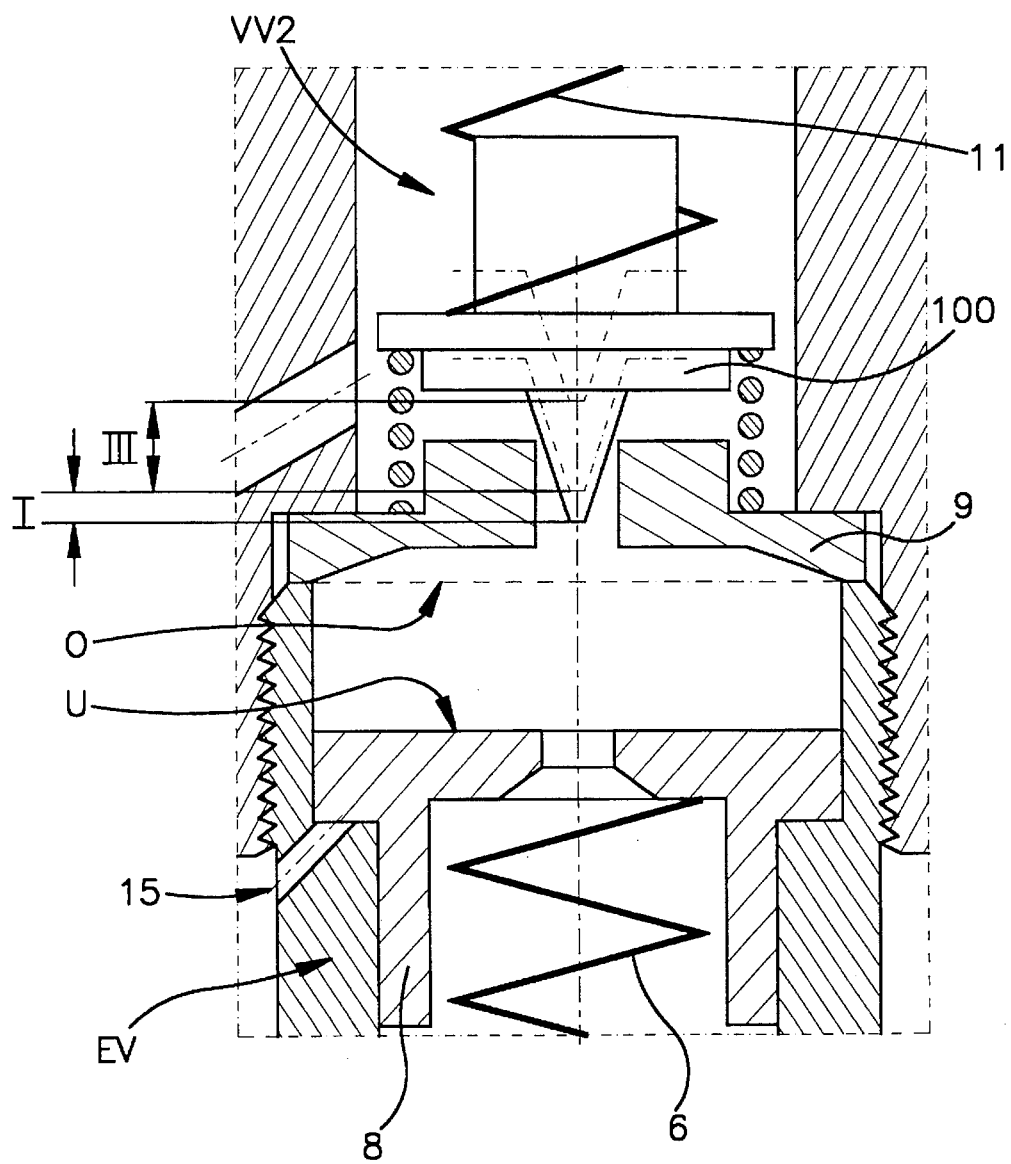
FIG. 4: an enlarged representation of a central part of the valve according to FIG. 3, but in the mode in which the control limits the valve intake pressure.

The design of the pressure relief and pressure control valve illustrated in FIGS. 3 and 4 largely corresponds to the pressure relief valve described previously. Consequently, components and groups of components which correspond with each other are identified by identical reference symbols. The only exception is the pilot valve VV2, but the function of said valve entirely corresponds with that of the pressure relief valve VV1 in the operating mode, i.e., when the pilot valve is situated in the fixed fully open position. Consequently, the following explanation is limited to the differences of the pilot valve and the control for limiting the valve intake pressure.

The pilot valve VV2 in this embodiment also is constructed in such a way that it may be changed between a first mode in which the relief device EV is activated and a second mode in which the relief device is deactivated, whereby the first mode serves for reducing the valve intake pressure p1 to a lower circulation pressure, and the second mode serves for a continuous control so as to reduce the valve intake pressure p1 to an operating pressure value that may be preset. In contrast to the pressure control valve described previously, the pilot valve is provided with a prestressing element 11 which is dimensioned or preferably may be adjusted in accordance with the limiting response values of the valve intake pressure p1 that may be preset. For this purpose, the pilot valve is provided with a valve element 100 which is separated from the tappet 13 of the electromagnet 12 and braced against said tappet by the prestressing element 11. The prestressing element 11 has the shape of a helical pressure spring which is centered on flanged projections of the tappet 13 and the valve element 100. Conventional elements and devices which are not shown in the figures may be used for adjusting the prestressing element, e.g., by dividing the tappet 13 into coaxial sections which may be adjusted relative to each other in the axial direction by means of suitable screws or similar elements. The degree to which the pilot valve opens in the second mode is determined by the valve intake pressure p1 in relation to the limiting response value. In the example shown, this is attained by the fact that the valve element 100 is stressed into the closing direction by the prestressing element 11 and in the opening direction by the control pressure p3. In the circulation pressure mode, the valve element assumes a fully open position I as is the case with the pressure relief valve.

Starting from a certain prestress of the valve element which is effective in the closing position of the pilot valve, the valve remains closed until an increasing control pressure p3, which acts upon the cross-sectional surface of the valve bore and is identical to the valve intake pressure p1 when the pilot valve is closed, generates a lifting force which exceeds the prestress force. The value of the valve intake pressure at this moment represents the response value which may be assigned the limiting nominal value of the system operating pressure. Practical values with respect to oil hydraulics lie in the range of, for example, a few hundred bar.

As the valve intake pressure p1 continues to increase, the pilot valve continues to open and consequently limits the pressure p3 to the value which is determined by the pilot spring 11, so that p3 and the closing force of the pilot spring 11 are in equilibrium. This means that a continued increase of p1 does not cause a pressure increase for p3, and that the main valve element 5 is displaced upward and the transverse bores 4 are released to the extent that a pressure-limiting equilibrium with VV2 is automatically adjusted.

The range of the opening stroke of the valve element 100 and consequently the region III of the partial open positions of the pilot valve which is indicated in FIG. 4 and lies within preset limitations of the control for limiting the operating pressure is correspondingly small as compared to the maximum open position I in the circulation pressure mode.

Consequently, at least the pressure drop which corresponds to the limiting response value and thus a correspondingly high control pressure p3 remain at the pilot valve VV2 in any case, so that the pressure force acting upon the resulting effective surface 23 which predominates over the resetting force holds the control piston 8 in its position U in which it is displaced towards the main valve element 5 while the main valve HV is under a correspondingly high prestress.

Depending on the specific application, all embodiments of the pilot valve may be used for a mechanical, hydraulic, pneumatic or electromagnetic control device for switching between a circulation pressure and an operating pressure.

I claim:

1. A pilot-operated hydraulic valve for switching the valve intake pressure (p1) between a higher operating pressure value and a lower circulation pressure value, in particular a pilot-operated hydraulic valve that is constructed as a pressure relief and pressure control valve, comprising:

a main flow path with an intake (16) and an outlet (17), including a main valve (HV) disposed in the main flow path and a pilot valve (VV1, VV2) which is operatively connected to the main valve;

the main valve (HV) including an elastic resetting element (6); and a relief device (EV) which is actuatable by the pilot valve (VV1, VV2) and which is operatively connected to the resetting element (6) to control the resetting of the main valve (HV);

the relief device (EV) being actuatable in response to operation of the pilot valve between an activated condition in which the force exerted by the resetting element (6) on the main valve (HV) is at a reduced level and a deactivated condition in which the force exerted by the resetting element on the main valve is at an increased level.

2. A hydraulic valve according to claim 1 wherein said relief device is in the deactivated condition and said main valve is in a closed condition when said pilot valve is in a closed condition.

3. A hydraulic valve according to claim 1, further comprising:

a control pressure chamber (18) with a control pressure (p3) which is determined by the pilot valve (VV1, VV2), said control pressure chamber being connected to the pilot valve (VV1, VV2); and wherein the relief device (EV) including a control piston (8) having an effective surface (23) which is exposed to the control pressure in the control pressure chamber (18);

the main valve resetting element comprises a spring which is operatively connected between the control piston (8) of the relief device (EV) and a main valve element (5); and the effective surface (23) of the control piston (8) is acted upon by the control pressure (p3) in a given direction which is the same direction in which the resetting element acts on the main valve element (5).

4. A hydraulic valve according to claim 3, characterized by the fact that the control pressure (p3) is determined by a feed flow from the valve intake (16) into the control pressure chamber (18) via a throttle (7) and a discharge flow from the control pressure chamber (18) which depends on the opening condition of the pilot valve (VV1, VV2).

5. Hydraulic valve according to claim 3, characterized by the fact that the control piston (8) comprises a differential piston with an effective surface (23) that is determined by sections of different diameters (D1, D2), and wherein an opposite side (23a) of this effective surface is situated in a relief chamber (21).

6. A hydraulic valve according to claim 3, wherein:

the main valve (HV) comprises a piston-shaped main valve element (5) which is arranged in a stepped bore (3) of a valve body (1), said main valve element having a bypass throttle (7), said resetting element (6) comprising a pressure spring which biases the main valve element (5) in a direction towards a closing position; and the relief device (EV) comprises a control piston (8) which is constructed as a differential piston and which has an effective surface (23) that is formed by sections of different diameters (D1, D2) as well as a passage (22) toward the pilot valve.

7. A hydraulic valve according to claim 6, wherein a relief chamber (21) which is connected to the valve outlet (17) is formed on the rear side of the effective surface (23) of the control piston.

8. A hydraulic valve according to claim 7 wherein the control piston (8) is arranged in a stepped bore (3), said relief chamber (21) being defined by the stepped bore and the control piston.

9. A hydraulic valve according to claim 3 wherein:

the main valve resetting element is positioned between the main valve element (5) and the control piston (8);

when the pilot valve (VV1) is in an open position, the control piston (8) is biased by the main valve resetting element (6) while its effective surface (23) is relieved of fluid pressure, the control piston thereby being held in a position (O) in which it is displaced away from the main valve element (5) to provide a reduced prestress of the main valve resetting element (6) and consequently a lower circulation pressure;

when the pilot valve (VV1) is in a closed position, the control pressure (p3) assumes the value of the valve intake pressure (p1) while the valve intake (16) is connected only to the control pressure chamber (18), so that the pressure force acting upon the effective surface (23) of the control piston (8) which overrides the resetting force holds the control piston in a position in which it is displaced towards the main valve element to provide a correspondingly increased prestress of the main valve resetting element (6).

10. A hydraulic valve according to claim 1 wherein the pilot valve (VV1) is movable between a fixed open position in which the relief device (EV) is in the activated condition and a fixed closed position in which the relief device is in the deactivated condition.

11. A hydraulic valve according to claim 1 wherein:

the pilot valve (VV2) is movable between a first mode in which the relief device (EV) is in the activated condition for reducing the valve intake pressure (p1) to a lower circulation pressure, and a second mode in which the relief device is in the deactivated condition for a continuous control so as to limit the valve intake pressure (p1) to an operating pressure value that may be preset;

the pilot valve (VV2) includes a prestressing element (11) the biasing effect of which may be adjusted and preset to vary the limiting response values of the valve intake pressure (p1); and when the pilot valve is in the second mode, the degree to which the pilot valve (VV2) opens is determined by the valve intake pressure (p1) in relation to the limiting response value as determined by the prestressing element (11).

12. A hydraulic valve according to claim 11, wherein the pilot valve (VV2) includes a valve element (100) which is stressed in the closing direction by a prestressing element (11) and which is stressed in the opening direction by the control pressure (p3), said valve element assuming a fixed open position (I) when said relief device is in the actuated condition.

13. A hydraulic valve according to claim 12 wherein:

the main valve resetting element (6) which is preferably constructed as a pressure spring is connected in a force-transmitting relationship between the main valve element (5) and the control piston (8);

in an open position (I) of the pilot valve (VV2), the control piston (8) is affected by the main valve resetting element (6) while its effective surface (23) is relieved, and the control piston consequently is held in a position (O) in which it is displaced away from the main valve element (5) such that a reduced prestress of the main valve resetting element (6) and consequently a lower circulation pressure is present;

within a range (III) of partial open positions of the pilot valve (VV2) and within preset limitations of the control for limiting the operating pressure, the pressure drop which corresponds at least to the limiting response value and is required for holding open the pilot valve element (100) and consequently a correspondingly high control pressure (p3) remain at the pilot valve (VV2), so that the pressure force acting upon the resulting effective surface (23) which overrides the resetting force holds the control piston (8) in a position (U) in which it is displaced towards the main valve element (5) under a correspondingly high closing prestress of the main valve (HV).

14. A hydraulic valve according to claim 1, comprising a mechanical, hydraulic, pneumatic or electromagnetic trigger device (12) for switching the pilot valve (VV1, VV2) to actuate the relief device.

15. A valve as set forth in claim 1 wherein said relief device comprises a movable member which moves relative to said main valve element when said relief device moves between the activated condition and the deactivated condition, movement of said movable member relative to said main valve element resulting in change in the biasing effect exerted by said elastic resetting element on said main valve element.

16. A valve as set forth in claim 15 wherein said movable member comprises a movable spring support which supports a first end of said elastic resetting element, a second end of said elastic resetting element being supported for movement with said main valve element, said movable spring support being movable between a first position relatively far from said main valve element when said relief device is in the activated condition, thereby to decrease the biasing effect of said elastic resetting element, and a second position relatively close to said main valve element when said relief device is in the deactivated condition, thereby to decrease the biasing effect of said elastic resetting element.

17. A valve as set forth in claim 1 wherein said relief device comprises means for changing the length and thereby the biasing effect of said elastic resetting element in response to movement of said relief device between the activated condition and the deactivated condition.

\* \* \* \* \*